(12) United States Patent
Fujimoto et al.

(10) Patent No.: US 12,099,186 B2
(45) Date of Patent: Sep. 24, 2024

(54) OPTICAL CONTROL DEVICE AND HEAD-UP DISPLAY APPARATUS INCLUDING THE SAME

(71) Applicant: Murata Manufacturing Co., Ltd., Nagaokakyo (JP)

(72) Inventors: Katsumi Fujimoto, Nagaokakyo (JP); Tsuguji Kambayashi, Nagaokakyo (JP); Toshiaki Yamashita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 606 days.

(21) Appl. No.: 17/392,504

(22) Filed: Aug. 3, 2021

(65) Prior Publication Data

US 2021/0364794 A1 Nov. 25, 2021

Related U.S. Application Data

(63) Continuation of application No. PCT/JP2020/008586, filed on Mar. 2, 2020.

(30) Foreign Application Priority Data

Mar. 8, 2019 (JP) ................................. 2019-042615

(51) Int. Cl.
| | |
|---|---|
| *G02B 26/08* | (2006.01) |
| *B60K 35/00* | (2006.01) |
| *G02B 7/182* | (2021.01) |
| *G02B 27/01* | (2006.01) |
| *B60K 35/23* | (2024.01) |
| *B60K 35/28* | (2024.01) |

(52) U.S. Cl.
CPC .......... *G02B 27/0101* (2013.01); *B60K 35/00* (2013.01); *G02B 7/1821* (2013.01);
(Continued)

(58) Field of Classification Search
CPC .............. G02B 27/0101; G02B 7/1821; G02B 26/0816; G02B 2027/0141; B60K 35/00;
(Continued)

(56) References Cited

U.S. PATENT DOCUMENTS

| 6,084,416 A | 7/2000 | Kishimoto |
| 2010/0079101 A1 | 4/2010 | Sidman |

(Continued)

FOREIGN PATENT DOCUMENTS

| CN | 1930451 A | 3/2007 |
| CN | 103256910 A | 8/2013 |

(Continued)

OTHER PUBLICATIONS

Written Opinion of the International Searching Authority issued for PCT/JP2020/008586, date of mailing Apr. 21, 2020.

(Continued)

*Primary Examiner* — Euncha P Cherry
(74) *Attorney, Agent, or Firm* — ArentFox Schiff LLP

(57) ABSTRACT

An optical control device is provided that controls an angle of a reflecting member. The optical control device includes a holding portion, an actuator, an angle detection unit, and a control unit. The angle detection unit is provided at a position outside an outer shape of the actuator in an actuator holder on which the actuator is placed, and detects a rotation angle of the reflecting member. The control unit drives the actuator based on the angle detected by the angle detection unit, and controls the rotation angle of the reflecting member.

20 Claims, 8 Drawing Sheets

(52) U.S. Cl.
CPC .......... *G02B 26/0816* (2013.01); *B60K 35/23* (2024.01); *B60K 35/28* (2024.01); *B60K 2360/166* (2024.01); *B60K 2360/167* (2024.01); *B60K 2360/23* (2024.01); *G02B 2027/0141* (2013.01)

(58) Field of Classification Search
CPC .. B60K 35/23; B60K 35/28; B60K 2360/166; B60K 2360/167; B60K 2360/23; G09F 9/00
See application file for complete search history.

(56) References Cited

U.S. PATENT DOCUMENTS

2019/0162828 A1\* 5/2019 Liang .................... G01S 7/4816
2020/0064640 A1  2/2020 Nagano et al.
2021/0265904 A1\* 8/2021 Takahashi .......... G02B 26/0816

FOREIGN PATENT DOCUMENTS

| | | |
|---|---|---|
| CN | 108473055 A | 8/2018 |
| JP | H0451112 A | 2/1992 |
| JP | H0593885 A | 4/1993 |
| JP | H07239242 A | 9/1995 |
| JP | H10185549 A | 7/1998 |
| JP | 2011131651 A | 7/2011 |
| JP | 2015102583 A | 6/2015 |

OTHER PUBLICATIONS

International Search Report issued for PCT/JP2020/008586, date of mailing Apr. 21, 2020.

\* cited by examiner

OPTICAL CONTROL DEVICE AND HEAD-UP DISPLAY APPARATUS INCLUDING THE SAME

CROSS REFERENCE TO RELATED APPLICATIONS

The present application is a continuation of PCT/JP2020/008586 filed Mar. 2, 2020, which claims priority to Japanese Patent Application No. 2019-042615, filed Mar. 8, 2019, the entire contents of each of which are incorporated herein by reference.

TECHNICAL FIELD

The present disclosure relates to an optical control device and a head-up display apparatus including the optical control device.

BACKGROUND

In recent years, a head-up display apparatus that displays driving information, such as a speed on a windshield provided in front of a driver's seat of a vehicle, has been developed. In a head-up display apparatus, in order to display driving information on a windshield, an image formed by a display unit needs to be reflected by a reflecting member such as a mirror and projected on the windshield.

However, when the head-up display apparatus is mounted on a vehicle, it is desired to accurately change a rotation angle of the reflecting member in accordance with a change in a line-of-sight position due to a driving posture, a change in the driver, or the like, or to accurately control the rotation angle of the reflecting member in response to the vibration of the reflecting member in a rotation direction due to the vibration of the vehicle.

Japanese Patent Application Laid-Open No. 2011-131651 (hereinafter "Patent Document 1") discloses a head-up display apparatus the employs a stepping motor as a motor unit attached to a rotation shaft of a reflecting member, and a rotation angle of the reflecting member can be accurately controlled. In this head-up display apparatus, the output of the stepping motor is decelerated by a reduction gear, and a rotation angle of the reflecting member can be rotated by a minute angle of plus or minus 2 degrees.

When a stepping motor having an accurate positioning control function is used as in the head-up display apparatus of Patent Document 1, the rotation angle of the reflecting member can be accurately controlled. However, the stepping motor is more expensive than a motor having no positioning control function, and there is a problem that the manufacturing cost of the head-up display apparatus including the stepping motor cannot be reduced.

When a motor (e.g., a DC motor, an ultrasonic motor, or the like) not having a positioning control function is used in the head-up display apparatus, it is necessary to provide a mechanism (e.g., an encoder or the like) that performs positioning control in the motor. When the mechanism is provided in the motor, there is a problem that a size of the motor itself becomes large and cannot be downsized. In particular, since a head-up display apparatus provided in a vehicle is mounted in a vehicle interior having a limited mounting space, downsizing in units of millimeters is required.

SUMMARY OF THE INVENTION

Therefore, it is an object of the present disclosure to provide an optical control device configured to accurately control a rotation angle of an optical component (e.g., a reflecting member) at low cost, and a head-up display apparatus including the optical control device.

Thus, an optical control device is provided according to an exemplary aspect of the present disclosure that controls a rotation angle of an optical component. In this aspect, the optical control device includes a holding portion that holds the optical component; a drive unit that is provided on a rotation shaft of the optical component held by the holding portion and changes the rotation angle of the optical component; an angle detection unit that is provided at a position outside an outer shape of the drive unit on a substrate on which the drive unit is placed and detects the rotation angle of the optical component; and a control unit that drives the drive unit based on the angle detected by the angle detection unit and controls the rotation angle of the optical component.

Moreover, a head-up display apparatus according to an exemplary aspect of the present disclosure is provided that projects an image onto a predetermined surface to perform display. The head-up display apparatus includes an image generation unit that generates an image to be projected, and the above-described optical control device that reflects the image generated by the image generation unit by the optical component held by the holding portion.

According to the present disclosure, an optical control device configured to accurately control a rotation angle of an optical component at low cost and a head-up display apparatus including the optical control device is provided.

DETAILED DESCRIPTION

Figure 1A:
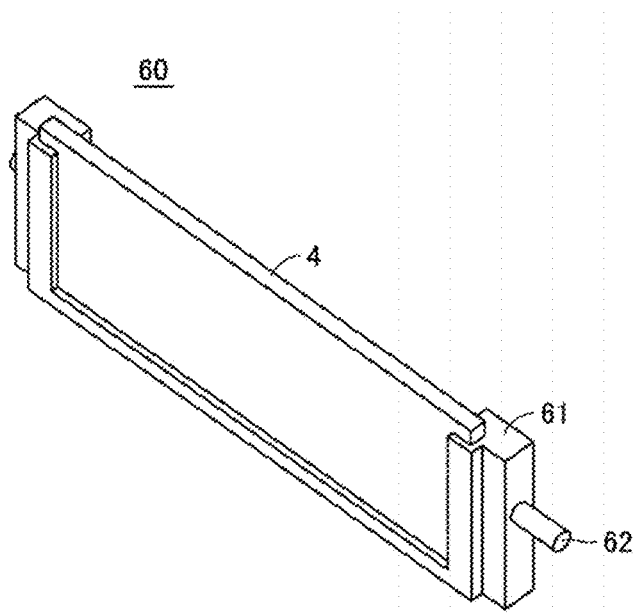
FIGS. 1(a) and 1(b) are perspective views of an optical control device according to a first exemplary embodiment.

Hereinafter, an optical control device according to an exemplary embodiment and a head-up display apparatus including the same will be described in detail with reference to the drawings. The same or corresponding parts in the drawings are denoted by the same reference numerals, and the description thereof will not be repeated.

First Exemplary Embodiment

Figure 1B:
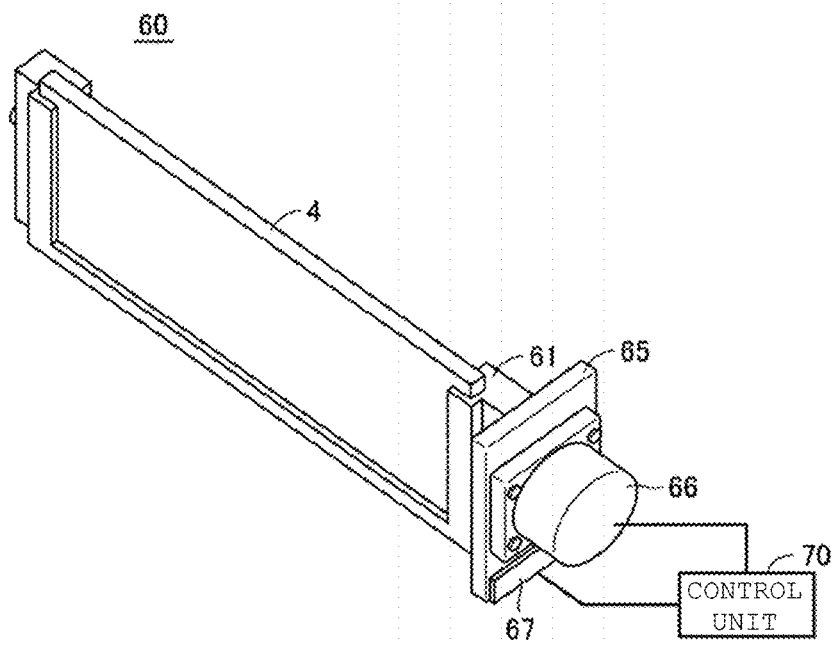
Figure 2:
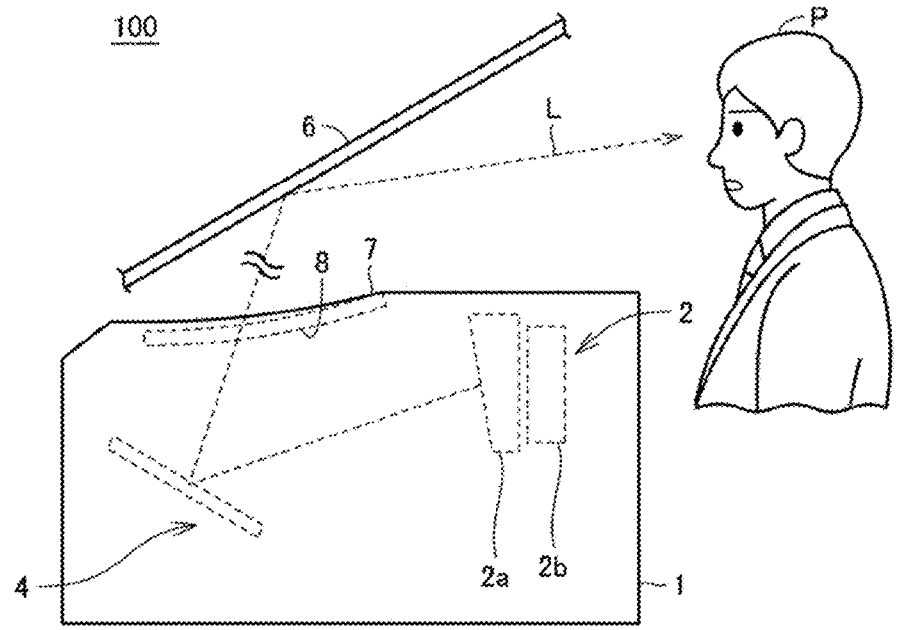
FIG. 2 is a schematic view of a head-up display apparatus including the optical control device according to the first exemplary embodiment.

First, FIGS. 1(a) and 1(b) are perspective views of an optical control device according to a first exemplary embodiment. FIG. 2 is a schematic view of a head-up display apparatus including the optical control device according to the first embodiment. A head-up display apparatus 100 illustrated in FIG. 2 is mounted on a vehicle such as an automobile, and includes a housing 1, an image generation unit 2, and a reflecting member 4.

As shown, the image generation unit 2 includes, for example, an LCD 2a and a backlight unit 2b, and the LCD 2a and backlight unit 2b generate an image to be projected onto a windshield 6 of the vehicle. Examples of the image generated by the image generation unit 2 include various vehicle information and navigation information. Although not illustrated, the backlight unit 2b includes, for example, a plurality of light emitting diodes and a lens that causes light from the light emitting diodes to enter the LCD 2a as would be appreciated to one skilled in the art.

In an exemplary aspect, the housing 1 is made of, for example, a synthetic resin, accommodates the image generation unit 2 and the reflecting member 4 therein, and is provided with an emission unit 7 that emits light L of an image toward the windshield 6 on a side facing the windshield 6. The emission unit 7 is covered with a translucent cover 8 to prevent dust from entering the housing 1.

The reflecting member 4 is, for example, an optical component, such as a plane mirror or the like, and reflects the light L of the image from the image generation unit 2 toward the emission unit 7 and projects the light L on the windshield 6. Thus, the head-up display apparatus 100 allows an occupant P of the vehicle to visually recognize the image generated by the image generation unit 2 while superimposing the image on the scenery.

In the head-up display apparatus 100, it is desired to accurately change a rotation angle of the reflecting member 4 in accordance with a change in the line-of-sight position due to the driving posture of the occupant P, a change of the driver, or the like, or to accurately control the rotation angle of the reflecting member 4 in response to the vibration of the reflecting member 4 in a rotational direction due to the vibration of the vehicle.

The optical control device 60 illustrated in FIGS. 1(a) and 1(b) is a control device that controls the rotation angle of the reflecting member 4. In FIG. 1(a), only a holding portion 61 (also referred to as a holding structure) that holds the reflecting member 4 is illustrated, and an actuator (also referred to as a drive unit) that changes an angle of the holding portion 61 is not illustrated. The holding portion 61 is provided with a rotation shaft 62 for rotating the reflecting member 4 held by the holding portion.

FIG. 1(b) illustrates the optical control device 60 in which an actuator 66 is attached to the rotation shaft 62. The actuator 66 is placed and fixed on an actuator holder 65 (e.g., a substrate), and is connected to the rotation shaft 62 of the holding portion 61 with the actuator holder 65 interposed therebetween.

The actuator holder 65 is provided with an angle detection unit 67 (also referred to as an angle detector) at a position outside the outer shape of the actuator 66 to detect a rotation angle of the reflecting member 4. A control unit 70 drives the actuator 66 based on an angle detected by the angle detection unit 67 to control the rotation angle of the reflecting member 4.

In the head-up display apparatus 100, the number of items to be displayed increases, an area to be projected increases, and the reflecting member 4 also tends to be large. On the other hand, the space for disposing the head-up display apparatus 100 is limited, and the space for disposing the optical control device 60 that controls the rotation angle of the reflecting member 4 is also required to be saved. Moreover, when the optical control device 60 is downsized, it is also necessary to downsize a drive mechanism of the holding portion 61 that holds the reflecting member 4, and when a stepping motor is used as the actuator 66, it is difficult to achieve high accuracy with the downsizing.

In the optical control device 60 according to the first embodiment, downsizing is achieved by using a DC motor or an ultrasonic motor for the actuator 66. When a DC motor is used for the actuator 66, it is necessary to combine the DC motor with a gear as necessary. In addition, the ultrasonic motor can be directly driven at a low speed and a high torque without being combined with a gear. It is noted that the actuator 66 is not limited to a DC motor or an ultrasonic motor, and may be an AC motor or the like.

However, when a DC motor or an ultrasonic motor is used as the actuator 66, since the actuator does not have a positioning control function unlike a stepping motor, an encoder is separately provided. When the rotation angle of the reflecting member 4 is controlled using the encoder, the size of the encoder should be reduced by reducing the size of the actuator 66. Therefore, there is a problem that the accuracy of controlling the rotation angle of the reflecting member 4 is reduced.

Figure 3:
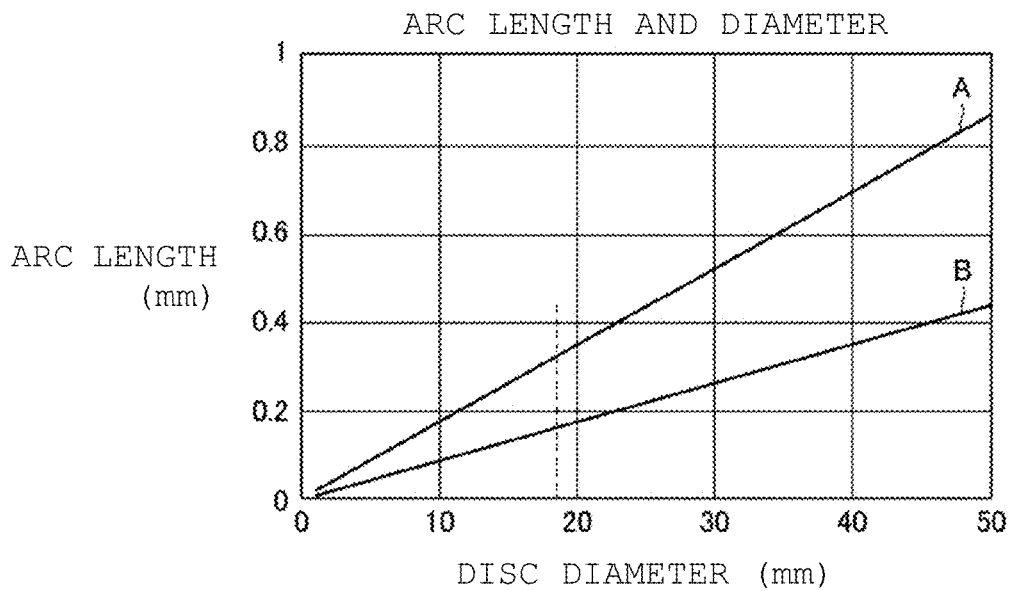
FIG. 3 is a diagram illustrating a relationship between an arc length and a diameter of an encoder.

FIG. 3 is a diagram illustrating a relationship between an arc length and a diameter of the encoder. In FIG. 3, the arc length (unit: mm) is set on a vertical axis, and the disc diameter (unit: mm) of the encoder is set on a horizontal axis. A graph A shows a change in arc length per degree, and a graph B shows a change in arc length per 0.5 degrees.

For example, when the disc diameter of the encoder is set to 18 mm (the position of a broken line illustrated in FIG. 3), the arc length per degree is about 0.36 mm, and the arc length per 0.5 degrees is about 0.18 mm. Therefore, when the encoder is also downsized by downsizing the actuator 66, the disc diameter of the encoder is also reduced, and thus the arc length per degree or the arc length per 0.5 degrees is shortened.

As described above, when the encoder is used to detect the rotation angle, a resolution is determined by the accuracy of dividing the arc length of the encoder. Therefore, when the disc diameter of the encoder is reduced, high processing accuracy is required to increase the resolution, and the cost increases.

Therefore, in the optical control device 60 according to the first embodiment, when a DC motor or an ultrasonic motor is used as the actuator 66, the encoder is not used, and the angle detection unit 67 that detects the rotation angle of the reflecting member 4 is provided at a position outside an outer shape of the actuator 66.

As illustrated in FIG. 1(b), the optical control device 60 adopts a mechanism for detecting the rotation angle of the reflecting member 4 by a change in an end portion of the rotating reflecting member 4 or holding portion 61, instead of being incorporated in a gear or a motor body for monitoring the rotation, with respect to the mechanism for detecting the rotation angle of the reflecting member 4. Therefore, in the optical control device 60, the accuracy of controlling the rotation angle of the reflecting member 4 does not decrease and the cost does not increase as the actuator 66 is downsized.

The angle detection unit 67 is provided with a conductor portion in the holding portion 61, and detects the rotation angle of the reflecting member 4 based on a change in value based on electromagnetism accompanying the movement of the conductor portion. Specifically, a metal plate which is a conductor portion is provided on an end side surface or a bottom portion of the holding portion 61, and the angle detection unit 67 detects a change in magnetism or electric capacity accompanying the movement of the metal plate. As shown in FIG. 1(*a*), when the holding portion 61 has a shape that holds the three sides of the reflecting member 4, the conductor portion is provided on the end side surface or the bottom portion of the holding portion 61, but the conductor portion may be directly provided on the end side surface or the bottom portion of the reflecting member 4 depending on the shape of the holding portion 61. In addition, when the material of the holding portion 61 is metal, it is not necessary to provide the conductor portion in the holding portion 61. The value based on electromagnetism includes values based on electricity, magnetism, and light.

Figure 4A:
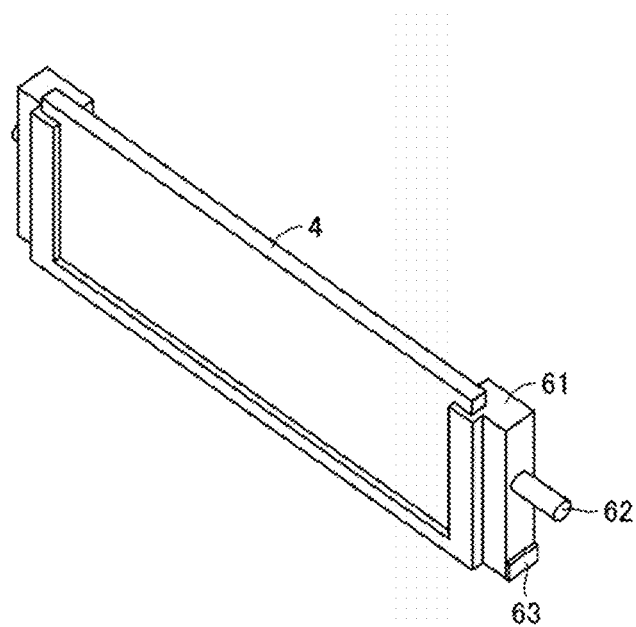
FIGS. 4(a) and 4(b) are diagrams illustrating an angle detection unit of the optical control device according to the first exemplary embodiment.
Figure 4B:
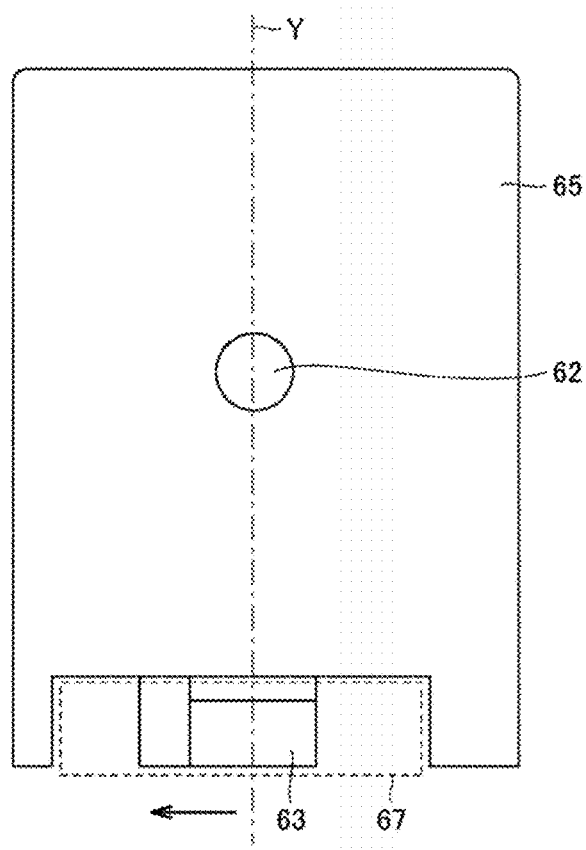

Hereinafter, the configuration of the angle detection unit 67 will be described in more detail. FIGS. 4(*a*) and 4(*b*) are diagrams illustrating the angle detection unit 67 of the optical control device 60 according to the first embodiment. FIG. 4(*a*) illustrates a view in which a metal plate 63 is provided on an end side surface of the holding portion 61. FIG. 4(*b*) illustrates a view of the metal plate 63 as viewed from a side of the actuator holder 65.

In FIG. 4(*b*), the angle detection unit 67 provided in the actuator holder 65 is indicated by a broken line in order to facilitate understanding of a position of the metal plate 63 provided in the holding portion 61. In the optical control device 60, the reflecting member 4 positioned on a Y axis is driven by an actuator 66 (not illustrated in these figures) connected to the rotation shaft 62, so that the metal plate 63 moves in, for example, an arrow direction as shown in FIG. 4(*b*). The angle detection unit 67 detects the rotation angle of the reflecting member 4 based on a change in magnetism or electric capacity associated therewith.

Figure 5:
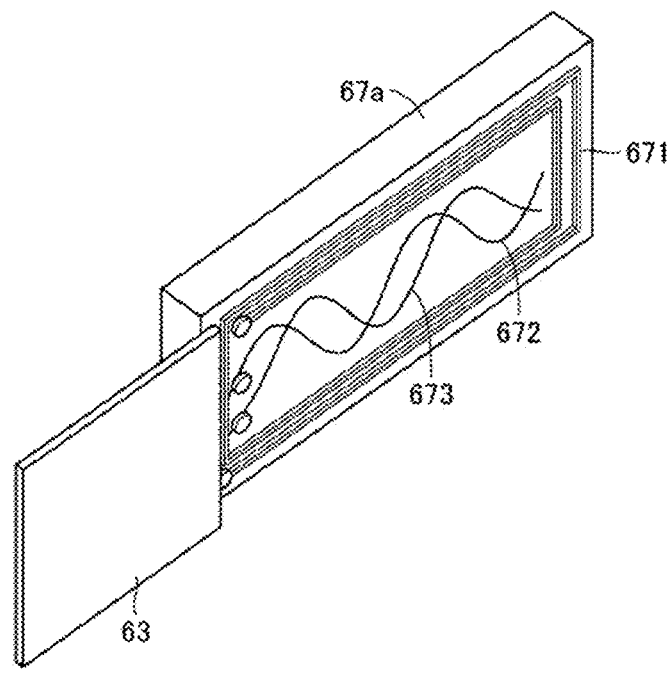
FIG. 5 is a diagram illustrating an angle detection unit that detects a rotation angle of a reflecting member by changing magnetism with movement of a metal plate.

FIG. 5 is a diagram illustrating an angle detection unit 67*a* that detects the rotation angle of the reflecting member 4 by changing magnetism with the movement of the metal plate 63. The angle detection unit 67*a* illustrated in FIG. 5 measures a detection voltage that changes due to absorption of a magnetic resonance system accompanying the movement of the metal plate 63, and detects the rotation angle of the reflecting member 4 by calculation from a result of the measurement.

In the angle detection unit 67*a*, a drive wiring 671 and sensor wirings 672 and 673 are provided on a surface facing the metal plate 63. Since an eddy current is generated in the metal plate 63 by a magnetic field generated by the drive wiring 671, the magnetic field in the vicinity of the sensor wirings 672 and 673 changes depending on the degree of overlap between the angle detection unit 67*a* and the metal plate 63. The angle detection unit 67*a* measures a change in voltage induced in the sensor wirings 672 and 673 by the change in the magnetic field, and detects the rotation angle of the reflecting member 4 by calculation from a result of the measurement. It is noted that the principle of this scheme is described in detail in U.S. Pat. No. 4,737,698, incorporated herein by reference.

Figure 6:
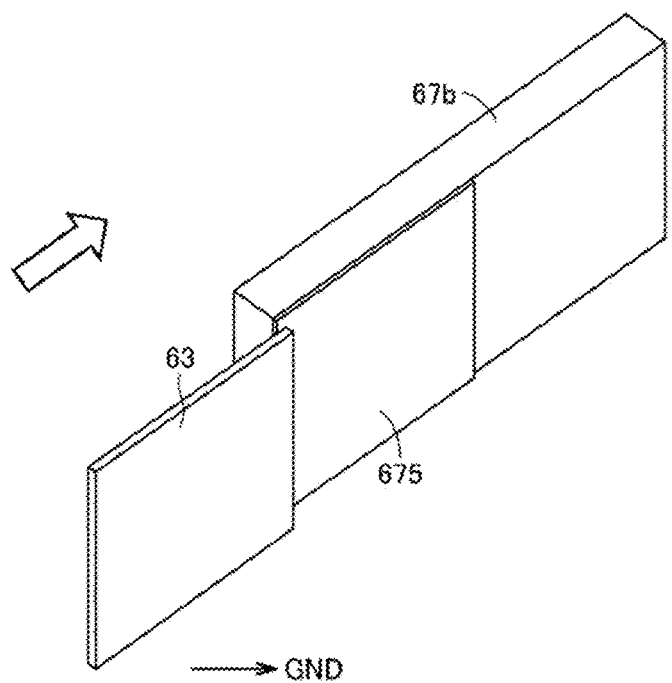
FIG. 6 is a diagram illustrating an angle detection unit that detects a rotation angle of a reflecting member by changing an electric capacity with movement of a metal plate.

FIG. 6 is a diagram illustrating an angle detection unit 67*b* that detects the rotation angle of the reflecting member 4 when an electric capacity changes with the movement of the metal plate 63. The angle detection unit 67*b* illustrated in FIG. 6 detects the rotation angle of the reflecting member 4 based on a change in electric capacity generated between the angle detection unit 67*b* and the metal plate 63 accompanying the movement of the metal plate 63.

In the angle detection unit 67*b*, on the premise that the metal plate 63 is grounded to a GND potential, an electrode 675 is provided on a surface facing the metal plate 63. The electric capacity of the angle detection unit 67*b* changes depending on the degree of overlap between the electrode 675 and the metal plate 63. The angle detection unit 67*b* measures a change in the electric capacity, and detects the rotation angle of the reflecting member 4 by calculation from a result of the measurement. In an exemplary aspect, the electrode 675 is a land pattern of copper foil formed on a substrate of the angle detection unit 67*b*, and a DC voltage is applied thereto.

Figure 7A:
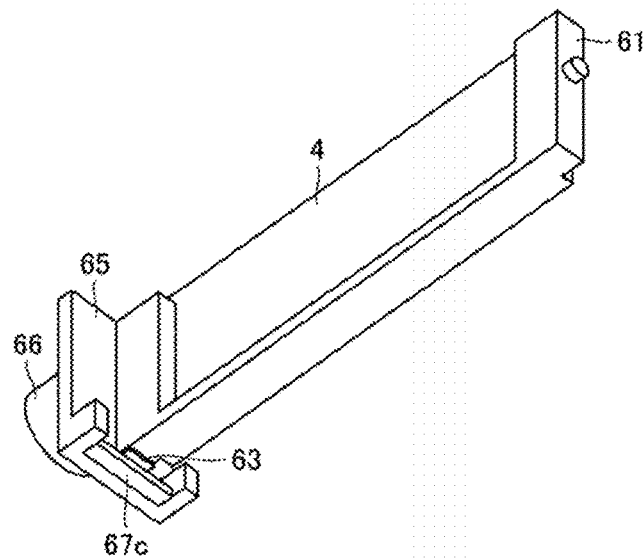
FIGS. 7(a) and 7(b) are diagrams illustrating an angle detection unit in a case where a metal plate is provided at the bottom portion of a holding portion.
Figure 7B:
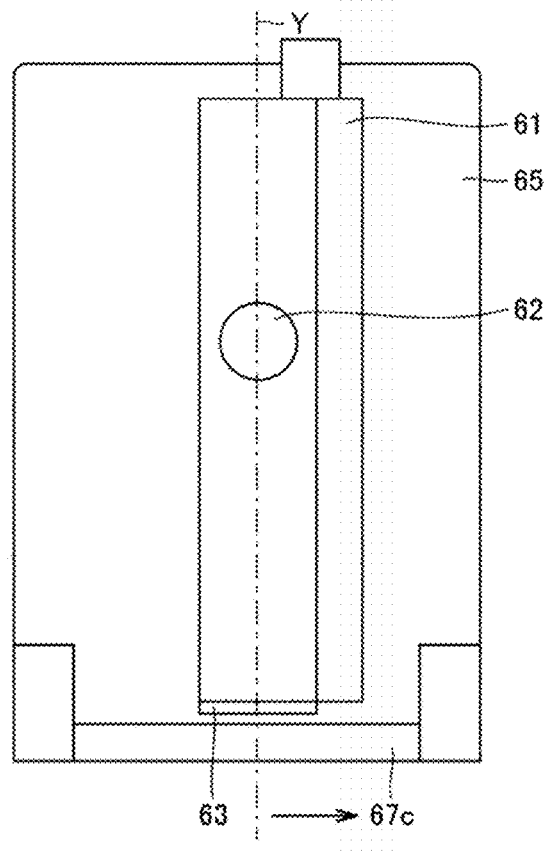

In FIGS. 5 and 6, an example in which the metal plate 63 is provided on the end side surface of the holding portion 61 has been described, but an example in which a metal plate is provided on the bottom portion of the holding portion 61 will be described. FIGS. 7(*a*) and 7(*b*) are diagrams illustrating an angle detection unit 67*c* in a case where the metal plate 63 is provided at the bottom portion of the holding portion 61. FIG. 7(*a*) illustrates a view in which the metal plate 63 is provided at the bottom portion of the holding portion 61. FIG. 7(*b*) illustrates a view of the holding portion 61 as viewed from a side where the actuator holder 65 is not provided.

In FIG. 7(*b*), the angle detection unit 67*c* is provided at a position facing the position of the metal plate 63 provided at the bottom portion of the holding portion 61, and the angle detection unit 67*c* is fixed to the actuator holder 65 at the position. In the optical control device 60, the reflecting member 4 positioned on a Y axis is driven by an actuator 66 (not illustrated in these figures) connected to the rotation shaft 62, so that the metal plate 63 moves in, for example, an arrow direction as shown in FIG. 7(*b*). Since magnetism or electric capacity changes as the metal plate 63 moves, the angle detection unit 67*c* detects the rotation angle of the reflecting member 4 based on the change.

It is also noted that the position where the angle detection unit 67*c* is provided is not limited to the actuator holder 65, and can be a substrate different from the actuator holder 65 as long as the substrate faces the bottom surface of the holding portion 61.

As described above, the optical control device 60 according to the first embodiment is an optical control device that controls an angle of the reflecting member 4. The optical control device 60 includes the holding portion 61, the actuator 66, the angle detection unit 67, 67*a*, 67*b* or 67*c*, and the control unit 70. The holding portion 61 holds the reflecting member 4. The actuator 66 is provided on the rotation shaft of the reflecting member 4 held by the holding portion 61, and changes the rotation angle of the reflecting member 4. The angle detection unit 67, 67*a*, 67*b* or 67*c* is provided at a position outside the outer shape of the actuator 66 in the actuator holder 65 on which the actuator 66 is placed, and detects the rotation angle of the reflecting member 4. Moreover, the control unit 70 drives the actuator 66 based on the angle detected by the angle detection unit 67, 67*a*, 67*b* or 67*c*, and controls the rotation angle of the reflecting member 4.

As a result, in the optical control device 60 according to the first embodiment, the rotation angle of the reflecting member 4 is detected by the angle detection unit 67, 67*a*, 67*b* or 67*c* provided at the position outside the outer shape of the actuator 66, so that the rotation angle of the reflecting member 4 can be accurately controlled at low cost.

The angle detection unit 67*a* or 67*b* can be configured to detect the rotation angle of the reflecting member 4 based on a change in a value based on electromagnetism accompanying the movement of the metal plate 63 provided on the holding portion 61 or the reflecting member 4. Thus, the angle detection unit 67*a* or 67*b* can easily detect the rotation angle of the reflecting member 4 with a simple configuration.

Further, the angle detection unit 67*a* can be configured to detect the rotation angle of the reflecting member 4 based on a detection voltage that changes due to absorption of the magnetic resonance system caused by the movement of the metal plate 63 provided in the holding portion 61. Thus, the angle detection unit 67*a* can easily detect the rotation angle of the reflecting member 4 with a simple configuration.

The angle detection unit 67*b* can also be configured to detect the rotation angle of the reflecting member 4 based on a change in electric capacity generated between the angle detection unit 67*b* and the metal plate 63 provided on the holding portion 61. Thus, the angle detection unit 67*b* can easily detect the rotation angle of the reflecting member 4 with a simple configuration.

Furthermore, the angle detection unit 67, 67*a* or 67*b* can be provided on the same surface of the actuator holder 65 on which the actuator 66 is placed (e.g., FIG. 1(*b*)). As a result, the optical control device 60 can be provided in which the angle detection unit 67, 67*a* or 67*b* is provided in the actuator holder 65.

The angle detection unit 67*c* can also be provided at a position facing the bottom surface of the holding portion 61 or the reflecting member 4. As a result, the degree of freedom of the position where the angle detection unit 67*c* is provided can be secured.

Moreover, the head-up display apparatus 100 according to the first embodiment is a head-up display apparatus that projects an image onto a predetermined surface to perform display. The head-up display apparatus 100 includes the image generation unit 2 that generates an image to be projected, and the above-described optical control device 60 that reflects the image generated by the image generation unit 2 by the reflecting member 4 held by the holding portion 61. Consequently, the head-up display apparatus 100 of the first embodiment can accurately control the rotation angle of the reflecting member 4, so that the image can stably be displayed at low cost.

Second Exemplary Embodiment

In the optical control device 60 according to the first embodiment, the method has been described in which the angle detection unit 67*a* or 67*b* detects the rotation angle of the reflecting member 4 based on the change in value based on electromagnetism accompanying the movement of the metal plate 63 provided on the holding portion 61 or the reflecting member 4. However, the method of detecting the rotation angle of the reflecting member is not limited thereto. In an optical control device according to the second exemplary embodiment, a method of detecting the rotation angle of the reflecting member based on a change in distance from the holding portion or the reflecting member will be described.

Figure 8:
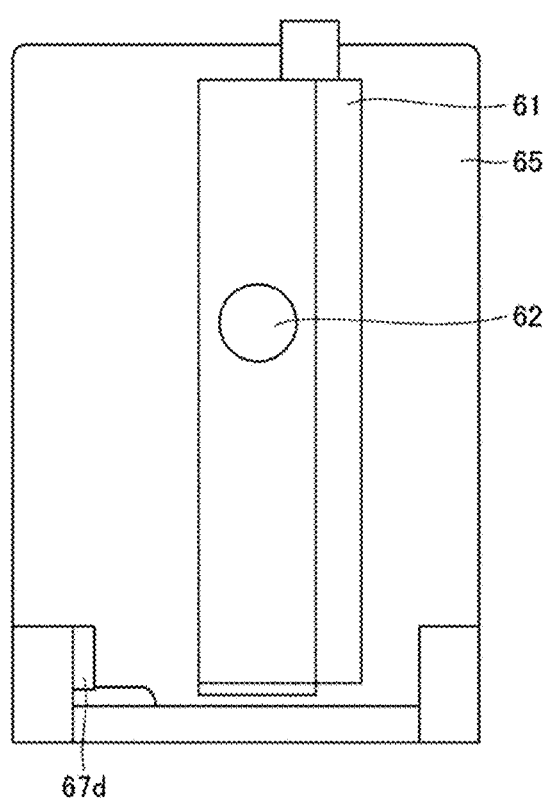
FIG. 8 is a diagram illustrating an angle detection unit of an optical control device according to a second exemplary embodiment.

FIG. 8 is a diagram illustrating an angle detection unit of the optical control device according to the second exemplary embodiment. In the optical control device illustrated in FIG. 8, the same components as those of the optical control device illustrated in FIG. 4 are denoted by the same reference numerals, and the detailed description thereof will not be repeated.

FIG. 8 illustrates a view of the holding portion 61 as viewed from a side where the actuator holder 65 is not provided. In FIG. 8, an angle detection unit 67*d* is provided so that the distance from the end of the holding portion 61 to one end of the actuator holder 65 can be measured, and the angle detection unit 67*d* is fixed to the actuator holder 65 at the position. In the optical control device 60, the reflecting member 4 positioned on the Y axis is driven by the actuator 66 (not illustrated in FIG. 8) connected to the rotation shaft 62, so that the distance between the angle detection unit 67*d* provided in the actuator holder 65 and the holding portion 61 changes. The angle detection unit 67*d* is a distance sensor, and detects the rotation angle of the reflecting member 4 based on the change in the distance to the end of the holding portion 61.

It is noted that the angle detection unit 67*d* is a distance sensor configured to measure a distance using changes in light, ultrasonic waves, electric capacity, and the like. In FIG. 8, the angle detection unit 67*d* is provided at a position where the distance to the end of the holding portion 61 having a large change in distance due to the movement of the holding portion 61 can be measured. However, the angle detection unit 67*d* can be provided at any position as long as the movement of the holding portion 61 by the driving of the actuator 66 can be detected.

As described above, the angle detection unit 67*d* of the second embodiment can detect the rotation angle of the reflecting member 4 based on the change in distance from the holding portion 61 or the reflecting member 4. As a result, the optical control device according to the second exemplary embodiment can accurately control the rotation angle of the reflecting member 4 at low cost.

As illustrated in FIG. 8, when the holding portion 61 has a shape that holds three sides of the reflecting member 4, the angle detection unit 67*d* measures the distance to the end of the holding portion 61. However, the angle detection unit 67*d* can also be configured to measure the distance to the end of the reflecting member 4 depending on the shape of the holding portion 61.

In addition, in a case where the angle detection unit 67*d* is a distance sensor configured to measure a distance using a change in light or ultrasonic waves, it is not necessary to provide a conductor portion on an end side surface or a bottom portion of the holding portion 61.

(First Modification)

In the above-described embodiments, for example, an example has been described in which the angle detection unit 67*a* or 67*b* detects the rotation angle of the reflecting member 4 as an analog value based on a change in value based on electromagnetism accompanying the movement of the metal plate 63 provided on the holding portion 61 or the reflecting member 4. However, the angle detection unit is not limited to this configuration, and may detect the rotation angle of the reflecting member 4 by a digital value according to another exemplary aspect.

Figure 9A:
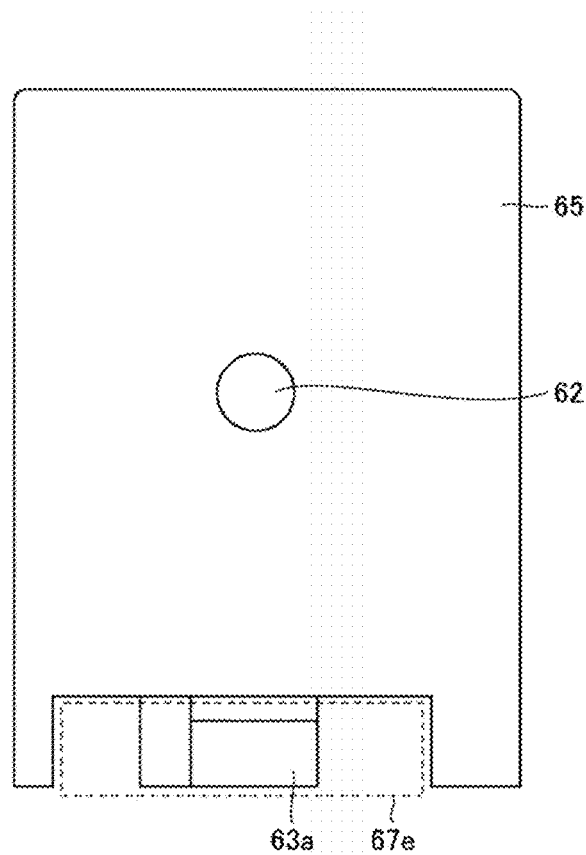
FIGS. 9(a) and 9(b) are diagrams showing an example of an angle detection unit that detects a rotation angle of a reflecting member by a digital value.
Figure 9B:
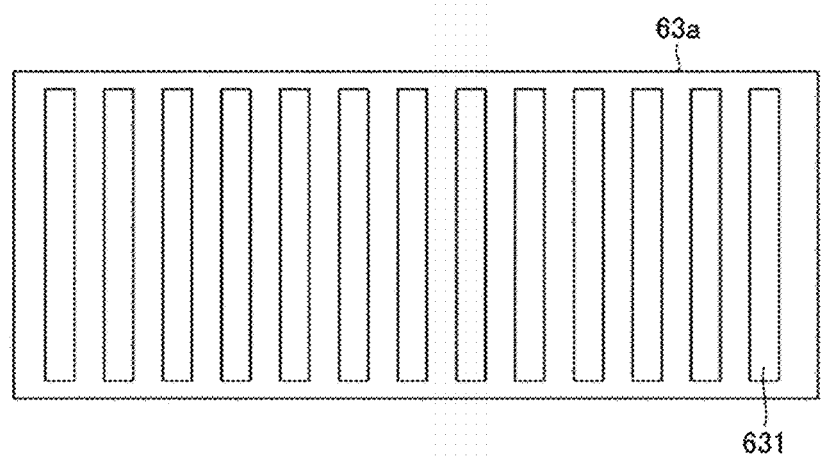

Specifically, FIGS. 9(*a*) and 9(*b*) are diagrams showing an example of an angle detection unit that detects the rotation angle of the reflecting member 4 by a digital value. FIG. 9(*a*) illustrates a view in which a reflecting plate 63*a* is provided on an end side surface of the holding portion 61 as viewed from a side of the actuator holder 65. FIG. 9(*b*) illustrates the reflecting plate 63*a*.

In FIG. 9(a), an angle detection unit 67e provided in the actuator holder 65 is indicated by a broken line in order to facilitate understanding of the position of the reflecting plate 63a provided in the holding portion 61. In the optical control device 60, the reflecting member 4 positioned on the Y axis is driven by the actuator 66 (not illustrated these figures) connected to the rotation shaft 62, so that the reflecting plate 63a moves.

A striped pattern is formed on the reflecting plate 63a, and the intensity of reflected light changes stepwise. The angle detection unit 67e can detect the rotation angle of the reflecting member 4 as a digital value by counting the stepwise change in the intensity of the reflected light from the reflecting plate 63a. It is also noted that the angle detection unit 67e includes a light reflection detection sensor.

Figure 10A:
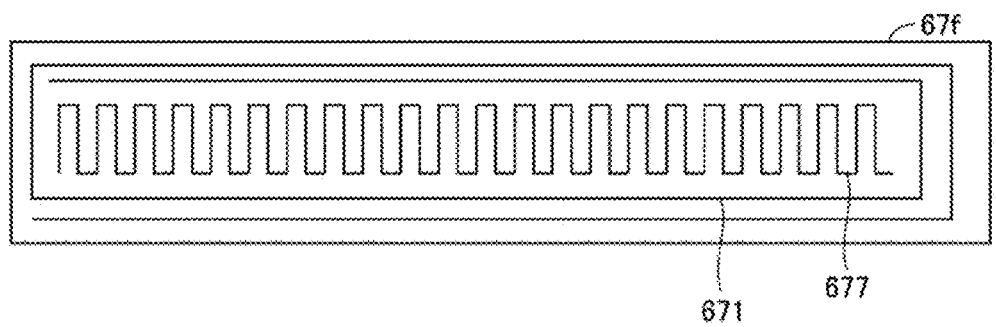
FIGS. 10(a) and 10(b) are diagrams showing another example of an angle detection unit that detects the rotation angle of the reflecting member by a digital value.
Figure 10B:
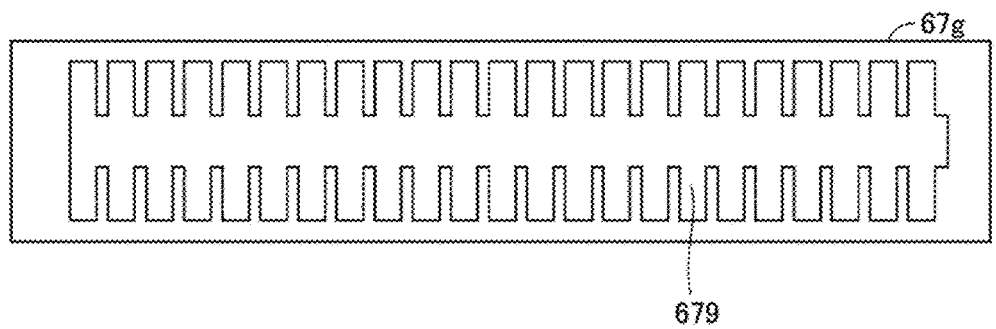

FIGS. 10(a) and 10(b) are diagrams showing another example of the angle detection unit that detects the rotation angle of the reflecting member 4 by a digital value. FIG. 10(a) illustrates an angle detection unit 67f in which the angle detection unit 67a illustrated in FIG. 5 is changed so as to detect the rotation angle of the reflecting member 4 by a digital value. The angle detection unit 67f is provided with the drive wiring 671 and the sensor wiring 677 on a surface facing the metal plate 63.

In the sensor wiring 677, the period of a wiring pattern is shortened to form a multi-periodic electrode, so that a change in voltage induced in the sensor wiring 677 becomes stepwise with the movement of the metal plate 63. Therefore, the angle detection unit 67f can detect the rotation angle of the reflecting member 4 as a digital value.

FIG. 10(b) illustrates an angle detection unit 67g in which the angle detection unit 67b illustrated in FIG. 6 is changed to detect the rotation angle of the reflecting member 4 by a digital value. The angle detection unit 67g is provided with a plurality of electrodes 679 arranged in a line in a moving direction of the metal plate 63.

The plurality of electrodes 679 are arranged in a line in the moving direction of the metal plate 63 to form a multi-periodic electrode, and the plurality of electrodes 679 are sequentially charged along with the movement of the metal plate 63, so that the change in electric capacity becomes stepwise. Therefore, the angle detection unit 67g can detect the rotation angle of the reflecting member 4 in a digital value.

As described above, the angle detection units 67f to 67g according to the present first modification have a configuration in which a value based on electromagnetism changes stepwise with the movement of the metal plate 63. Thus, the angle detection units 67f to 67g can detect the rotation angle of the reflecting member 4 as a digital value.

(Second Modification)

In the above-described embodiments, the configuration in which the optical control device 60 is used for the head-up display apparatus 100 has been described. However, the optical control device 60 can be similarly used not only for the head-up display apparatus 100 but also for an apparatus in which it is necessary to control the rotation angle of the optical component. For example, the device can also be used for an apparatus for fine adjustment of an optical stage, a laser scanner apparatus, and the like, and particularly in automobile applications, the device can be used for apparatuses for laser irradiation angle adjustment of laser imaging detection and ranging (LIDAR), headlight projection angle adjustment, and the like.

(Third Modification)

In the above-described embodiments, the configuration in which the optical control device 60 controls the rotation angle of the reflecting member 4 has been described. However, since, in the optical control device 60, an optical component other than the reflecting member 4 can be held on the holding portion 61, it is also possible to control the rotation angles of the optical component other than the reflecting member 4. Examples of the optical component other than the reflecting member 4 include a lens (cylindrical lens) and a diffraction grating. When a diffraction grating is used as the optical component of the optical control device 60, the optical control device 60 can be used for an apparatus that performs spectroscopic analysis by scanning the diffraction grating.

It should be understood that the exemplary embodiments disclosed herein are illustrative in all respects and not restrictive.

DESCRIPTION OF REFERENCE SYMBOLS

1: Housing
2: Image generation unit
2b: Backlight unit
4: Reflecting member
6: Windshield
7: Emission unit
8: Cover
60: Optical control device
61: Holding portion
62: Rotation shaft
63: Metal plate
63a: Reflecting plate
65: Actuator holder
66: Actuator
67, 67a to 67g: Angle detection unit
70: Control unit
100: Head-up display apparatus

The invention claimed is:

1. An optical control device for controlling a rotation angle of an optical component, the optical control device comprising:
   a holding structure configured to hold the optical component;
   a drive unit arranged on a rotation shaft of the optical component held by the holding structure and configured to change the rotation angle of the optical component;
   an angle detector configured to detect the rotation angle of the optical component; and
   a control unit configured to drive the drive unit based on the angle detected by the angle detector and to control the rotation angle of the optical component,
   wherein the angle detector is configured to detect the rotation angle of the optical component based on a change in a value based on electromagnetism accompanying movement of a conductor disposed in the holding structure or the optical component.

2. The optical control device according to claim 1, wherein the angle detector is configured such that a value based on the electromagnetism changes stepwise with movement of the conductor.

3. The optical control device according to claim 1, wherein the angle detector is configured to detect the rotation angle of the optical component based on a detection voltage that changes due to absorption of a magnetic resonance system accompanying the movement of the conductor disposed in the holding structure.

4. The optical control device according to claim 1, wherein the angle detector is configured to detect the rotation angle of the optical component based on a change in electric capacity generated between the angle detector and the conductor disposed in the holding structure.

5. The optical control device according to claim 1, wherein the angle detector is disposed on a same surface of a substrate on which the drive unit is disposed.

6. The optical control device according to claim 1, wherein the angle detector is disposed at a position facing a bottom surface of the holding structure or the optical component.

7. An optical control device for controlling a rotation angle of an optical component, the optical control device comprising:
   a holding structure configured to hold the optical component;
   a drive unit arranged on a rotation shaft of the optical component held by the holding structure and configured to change the rotation angle of the optical component;
   an angle detector configured to detect the rotation angle of the optical component; and
   a control unit configured to drive the drive unit based on the angle detected by the angle detector and to control the rotation angle of the optical component,
   wherein the angle detector is configured to detect the rotation angle of the optical component based on a change in a distance from the holding structure or the optical component.

8. The optical control device according to claim 1, wherein the drive unit is an actuator comprising at least one of DC motor and an ultrasonic motor.

9. The optical control device according to claim 1, wherein the conductor is a metal plate disposed on an end side surface or a bottom of the holding structure.

10. The optical control device according to claim 9, wherein the angle detector is configured to detect a change in magnetism or electric capacity accompanying a movement of the metal plate.

11. The optical control device according to claim 10, further comprising a drive wiring and sensor wirings disposed on a surface of the angle detector that faces the metal plate, such that a magnetic field adjacent to the sensor wirings changes depending on a degree of overlap between the angle detector and the metal plate.

12. The optical control device according to claim 11, wherein the angle detector is configured to measure a change in a voltage induced in the sensor wirings by the change in the magnetic field, and to detect the rotation angle of the optical component based on the measured change in the voltage.

13. The optical control device according to claim 7, wherein the angle detector is a distance sensor configured to measure the distance using one of a change in light, ultrasonic waves, and electric capacity.

14. An optical control device for controlling a rotation angle of an optical component, the optical control device comprising:
   a holding structure that holds the optical component;
   an actuator disposed on a rotation shaft of the optical component held by the holding structure and that changes the rotation angle of the optical component;
   an angle detector configured to detect the rotation angle of the optical component; and
   a control unit configured to drive the actuator based on the angle detected by the angle detector and to control the rotation angle of the optical component,
   wherein the angle detector is configured to detect the rotation angle of the optical component based on a change in a value based on electromagnetism accompanying movement of a conductor disposed in the holding structure.

15. The optical control device according to claim 14, wherein the angle detector is arranged at a position outside an outer shape of the actuator on a substrate on which the actuator is placed.

16. The optical control device according to claim 14, wherein the angle detector is configured to detect the rotation angle of the optical component based on a detection voltage that changes due to absorption of a magnetic resonance system accompanying the movement of the conductor disposed in the holding structure.

17. The optical control device according to claim 14, wherein the angle detector is configured to detect the rotation angle of the optical component based on a change in electric capacity generated between the angle detector and the conductor disposed in the holding structure.

18. A head-up display apparatus for projecting an image onto a surface to perform display, the head-up display apparatus comprising:
   an image generation unit configured to generate an image to be projected; and
   the optical control device according to claim 1,
   wherein the image generated by the image generation unit is reflected by the optical component held by the holding structure.

19. The optical control device according to claim 1, wherein the angle detector is arranged at a position outside an outer shape of the drive unit on a substrate on which the drive unit is placed.

20. The optical control device according to claim 7, wherein the angle detector is arranged at a position outside an outer shape of the drive unit on a substrate on which the drive unit is placed.

* * * * *